United States Patent [19]
Siiter

[11] 4,197,665
[45] Apr. 15, 1980

[54] IDENTIFICATION LOCKET

[76] Inventor: Donald H. Siiter, 930 E. Orange St., St. Paul, Minn. 55106

[21] Appl. No.: 963,033

[22] Filed: Nov. 22, 1978

[51] Int. Cl.[2] .............................................. G02B 7/02

[52] U.S. Cl. .................................... 40/365; 40/10 R; 63/18

[58] Field of Search .................. 40/1.5, 2.2, 10 R, 1.6, 40/365, 10 D, 362, 152, 21 A, 152.1, 156, 154, 155, 158 R, 158 B; 63/18, 19; 350/243-248, 250-252, 256

[56] References Cited

U.S. PATENT DOCUMENTS

| | | | |
|---|---|---|---|
| 144,153 | 10/1873 | Smith | 63/18 |
| 296,741 | 4/1884 | Gould | 63/19 |
| 302,722 | 7/1884 | Gould | 63/19 |
| 944,744 | 12/1909 | Pine | 63/19 X |
| 1,100,022 | 6/1914 | Lawrence | 63/19 |
| 1,137,088 | 4/1915 | Rosten et al. | 63/23 |
| 1,182,254 | 5/1916 | Cummins | 40/21 A X |
| 1,333,284 | 3/1920 | Schreiber | 40/16 X |
| 1,884,968 | 10/1932 | Bloch | 350/242 |
| 2,746,346 | 5/1956 | Gaire | 350/251 |
| 2,905,054 | 9/1959 | Logan | 350/252 X |
| 3,178,842 | 4/1965 | Zimmerman | 40/10 R |
| 3,180,042 | 4/1965 | Destal | 63/18 |
| 3,409,347 | 11/1968 | Vogel | 350/242 |
| 3,797,917 | 3/1974 | Barbour | 350/250 |
| 4,044,889 | 8/1977 | Orentreich et al. | 350/243 X |
| 4,122,619 | 10/1978 | Kruger | 40/365 |

*Primary Examiner*—John F. Pitrelli
*Attorney, Agent, or Firm*—Kinney, Lange, Braddock, Westman and Fairbairn

[57] ABSTRACT

An information locket includes an outer housing having substantially parallel front back walls and a partial side wall, and an inner member which is pivotally connected between the front and back walls. The inner member includes a magnifying lens portion and an inner member side wall. The inner member has a storage position in which it is held between the front and back walls of outer housing with a portion of the inner member side wall forming the remaining portion of the outer housing side wall. An information bearing card, which contains personal and medical information printed in substantially reduced form, is held in a compartment formed by one surface of the magnifying lens and the inner member side wall. When the inner member is pivoted to a viewing position, the information bearing card may be removed from the compartment and read by looking through the magnifying lens portion of the inner member.

13 Claims, 6 Drawing Figures

IDENTIFICATION LOCKET

BACKGROUND OF THE INVENTION

1. Field of the Invention

The present invention relates to a device which is designed to be carried by a person or a pet animal and which contains medical as well as identification information. In particular, the present invention is an identification locket which includes a card or other information bearing member containing information in substantially reduced form, together with a magnifying member which, when used in conjunction with the information bearing member, permits the information to be read.

2. Description of the Prior Art

Identification lockets for both humans and for pets have been used in the past. These identification lockets in most cases contain the name and address of the person wearing the locket, or the name and address of the owner of the pet. It has been recognized that further information beyond merely name and address can be very valuable. For example, information as to allergies, blood type, diseases or conditions, and currently used medication is extremely valuable in the case of a medical emergency.

U.S. Pat. No. 3,178,842 by Zimmerman and No. 3,180,042 by Destal describe information lockets containing information in greatly reduced form, so that it is not readable to the naked eye. This great reduction in the size of the information permits a large amount of personal and medical information to be contained in a relatively small locket.

The Zimmerman U.S. Pat. No. 3,178,842 shows a fold-up case or locket in which there is a magnifying lens in one leg and a microfilm transcript of the wearer's medical information in the other leg. These two legs are normally folded down to form the locket. When they are folded out, one can read the medical information by holding the unit up to light.

The Destal U.S Pat. No. 3,180,042 merely shows a locket containing a microfilm transcript of personal information. In order to read the information contained in the transcript, a separate microscope or magnifying glass is required.

SUMMARY OF THE INVENTION

The information locket of the present invention contains an information bearing member which contains information in substantially reduced form. This information is human readable when magnified by magnifying means contained within the locket.

The locket includes an outer housing having front and back walls which are connected by a first partial outer housing side wall. The first outer housing side wall follows the periphery of the front and back walls for a portion of the periphery.

An inner member is pivotally connected between the front and back walls of the outer housing. The inner member has a storage position between the front and back walls, and may be pivotally moved from the storage position within the outer housing to a viewing position. The inner member includes magnifying means having one convex surface and one substantially flat surface. An inner member side wall surrounds at least a portion of the magnifying means and has a portion which forms a second partial outer side wall when the inner member is in its storage position. The remaining portion of the inner member side wall conforms with the configuration of the inner side of the first partial outer housing side wall.

One of the surfaces of the magnifying means and the inner member side wall form a compartment. The information bearing member is lodged in the compartment when the inner member is in the storage position. When the inner member is pivotally moved to the viewing position, the information bearing member may be removed from the compartment. The information contained on the information bearing member is human readable when viewed through the magnifying means.

DETAILED DESCRIPTION OF THE PREFERRED EMBODIMENTS

As illustrated in the Figures, the information locket of the present invention includes an inner member 10 which is pivotally mounted within an outer housing 12 formed by outer walls 14 and 16 and first partial outer housing side wall 18. In the embodiment shown in the Figures, outer walls 14 and 16 are essentially parallel to one another. Side wall 18 is connected between walls 14 and 16 and extends around approximately one half of the periphery of the outer housing.

Figure 1:
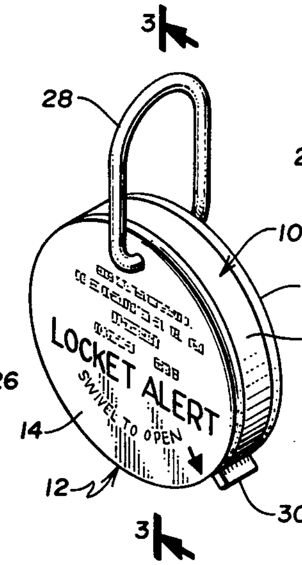
FIGS. 1 and 2 are perspective view of the information locket of the present invention with the inner member in its storage position and in its viewing position, respectively.
Figure 2:
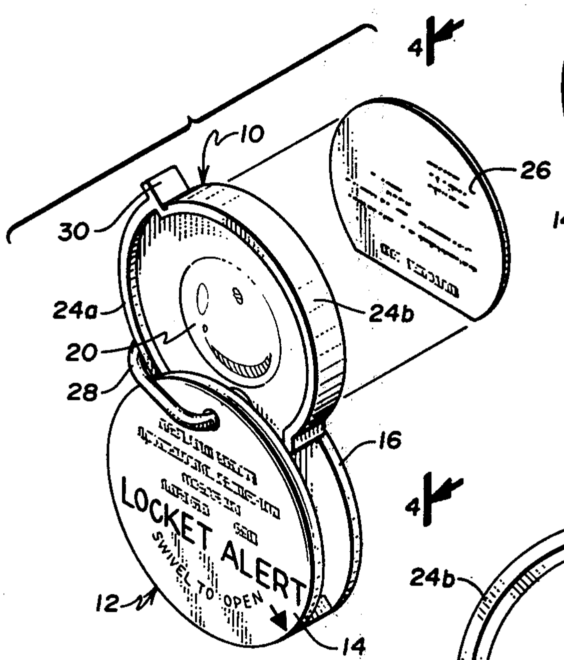

In FIG. 1, inner member 10 is in its storage position between the outer walls 14 and 16 of the outer housing. In FIG. 2, inner member 10 is pivoted to its viewing position.

Figure 3:
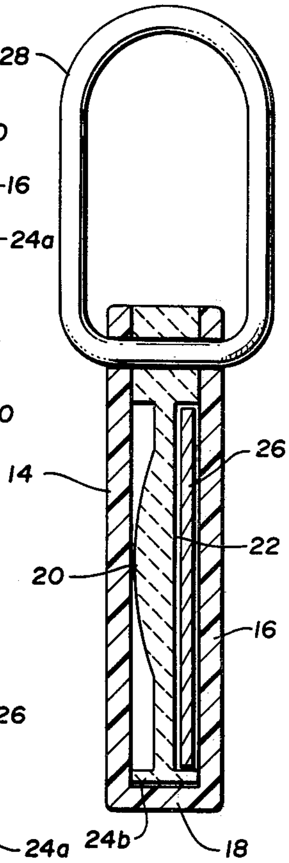
FIG. 3 is a cross-sectional view of the information locket along line 3—3 of FIG. 1.

Inner member 10 includes a magnifying lens portion, which is preferably of clear plastic. This magnifying lens portions includes a convex surface 20 and a substantially flat surface 22, which is best shown in FIG. 3. Inner member 10 also includes an inner member side wall having two portions **24*a* and 24*b*. Portion 24*a* is of larger radius than portion 24*b*, and conforms in radius to the outer radius of plates 14 and 16 of outer housing 12. When inner member 10 is in its storage position, inner member side wall 24*a* forms a second partial outer housing side wall of the information locket. Inner side wall portion 24*a* and first partial outer housing side wall 18 form a complete outer housing side wall around the periphery of the locket when inner member 10** is in the storage position.

The second portion **24*b* of the inner side wall has a smaller radius than portion 24*a*. Portion 24*b* generally conforms to the inner surface of fisrt partial outer housing side wall 18 when inner member 10** is in the storage position.

Information bearing member 26, which is preferably a paper card, is contained within the locket when the inner member is in the storage position. When inner member 10 is pivoted to its viewing position, information bearing member 26 is removed from the locket and is viewed through the magnifying lens formed by convex surface 20 and flat surface 22 of inner member 10. The information printed on information bearing member 26 is preferably personal and medical information pertaining to the wearer of the locket. This information is in greatly reduced form and typically is not human readable unless magnified. The magnifying lens of inner member 10 is of sufficient magnification to permit the information on information bearing member 26 to be read.

Flat surface 22 and side walls **24*a* and 24*b* of inner member 10 form a compartment in which information bearing member 26 is contained. FIG. 3 shows the location of information bearing member 26 between flat surface 22 and the inner surface of outer plate 16**.

Inner member 10 is pivotally mounted between plates 14 and 16 of outer housing 12 by ring 28. Ring 28 forms a pivot pin about which inner member 10 may be pivoted, and also provides a means by which the locket may be attached to a chain or, in the case of a pet, to the pet's collar.

Figure 5:
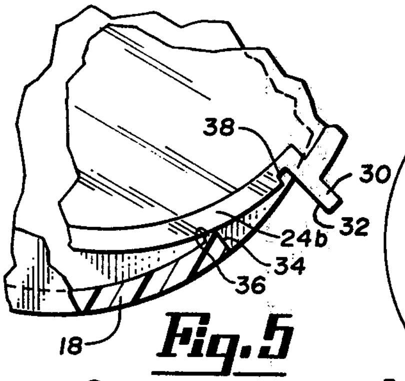
FIGS. 5 and 6 are partial front elevational views with a portion of the front wall of the outer housing broken away to illustrate the locking of the inner member in its storage position.
Figure 6:
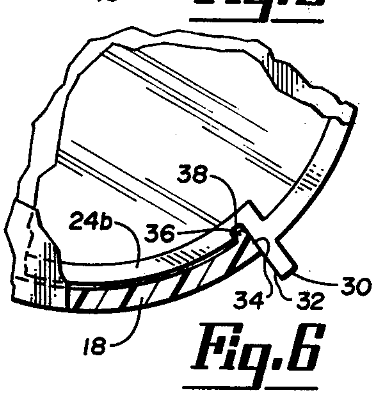

FIGS. 5 and 6 illustrate the locking and opening mechanism of the information locket. As shown in FIGS. 5 and 6, inner member 10 includes a grasping tab 30 which is grasped and pulled when pivoting inner member 10 from its storage position to its viewing position. One surface 32 of grasping tab 30 also abuts end surface 34 of first partial outer housing side wall 18 when inner member 10 has reached the storage position. A lip 36 at the end of first partial outer housing side wall 18 and a lip receiving depression 38 in inner side wall member **24*b* cooperate to provide a locking mechanism which normally holds inner member 10 in the storage position until sufficient force is applied to grasping tab 30 to pivot inner member 10 and remove lip 36 from depression 38. The material of outer wall 18 is sufficiently resilient to allow lip 36 to move out of depression 38 when such force is applied to tab 30**.

Figure 4:
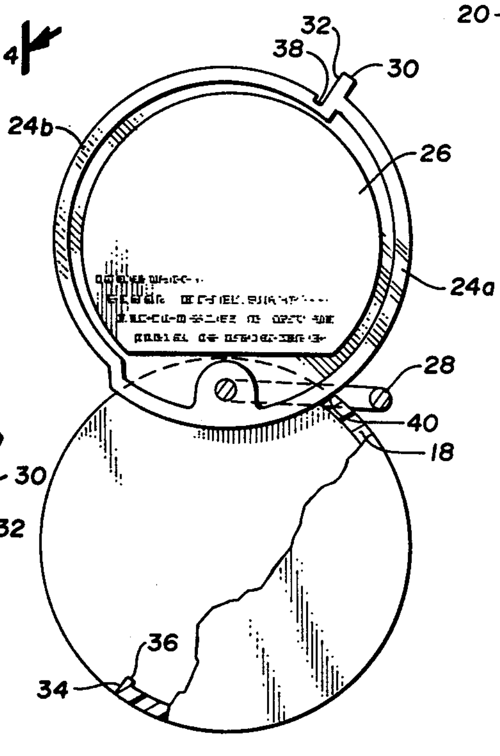
FIG. 4 is a rear elevational view with a portion being shown in section, the section being taken along line 4—4 of FIG. 3.

As illustrated in FIG. 4, the opposite end 40 of first partial outer housing side wall 18 acts as a stop for inner member 10 in the viewing position. End 40 acts against the surface of inner side wall **24*a* to limit the pivoting of inner member 10** to a position in which the entire magnifying lens is in view.

As illustrated in FIGS. 1–6, the present invention is a particularly advantageous information locket. It has relatively simple construction, uses a minimum number of parts, and is capable of being fabricated out of molded plastic.

In one preferred embodiment, the outer diameter of the information locket was about 1.25 inches, and the thickness of the locket was 0.25 inches. The outer radius of inner member side wall portion **24*a* was 0.625 inches, and the outer radius of portion 24*b* was 0.577 inches. First partial outer housing side wall 18 extended around approximately one-half of the periphery of the locket and was displaced by approximately 38° with respect to a vertical axis through the pivot point of inner member 10** and through the center of the locket.

In this preferred embodiment, the compartment within which information bearing member 26 was lodged had a thickness of about 0.046 inches. This was sufficient thickness to permit a paper card to be lodged in the compartment without interfering with the opening and closing of the locket.

Despite the extremely small size of the locket, a large amount of important personal and medical information can be stored on information bearing member 26. If still further information is desired, information may be printed on both sides of the information bearing member 26. Although information bearing member 26 may be either transparent or opaque, the use of an opaque paper card as member 26 permits the printing of information on both sides if desired.

Typical of the personal and medical information which may be printed on information bearing member 26 for a person are physical identification information such as name, address, occupation, social security number, date of birth, sex, and religion. The medical information may include a special medical alert for particular pre-existing disease or conditions which might affect medical treatment, such as heart problems, diabetes, epelipsy, high blood pressure, asthma, hemophilia, drug allergies, or the like. Other items of medical history, and the results of a most recent checkup may also be reflected on the information bearing member. Finally, the insurance carrier, the private physician, and the person to be notified in the case of an emergency are typically indicated on information bearing member 26.

When the identification locket of the present invention is attached to the collar of a pet, the information contained on information bearing member 26 typically includes the owrner's name, address and telephone number, the animal's name, species, color and markings, and the veterinarian's name, address and telephone number. The pet's medical history, including vaccinations for rabies, distemper, hepatitis, and the like, the date of heartworm checks and fecal checks, the existence of any life threatening illnesses, the medications currently being taken by the pet, and any allergies to drugs or other substances are also included.

Due to the highly reduced form of the information contained on information bearing member 26, all of the information described for either a human or a pet can be contained on information bearing member 26, while still permitting the information to be easily read when information bearing member 26 is removed from the locket and viewed through the magnifying lens portion of inner member 10.

Although the present invention has been described with reference to preferred embodiments, workers skilled in the art will recognize that changes may be made in form and detail without departing from the spirit and scope of the invention.

What is claimed is:

1. An information locket for the storage and immediate retrieval of information, the information locket comprising:

an outer housing including substantially parallel front and back walls which are connected by a first partial outer housing side wall which follows the periphery of the front and back walls for a portion of the periphery;

an inner member having a storage position between the front and back walls of the outer housing, with a similar configuration as the front and back walls, the inner member including magnifying means having one convex surface and one substantially flat surface and an inner member side wall surrounding at least a portion of the magnifying means, the inner member side wall having a portion which forms a second partial outer housing side wall when the inner member is in its storage position and a remaining portion which conforms with the configuration of the inner surface of the first partial outer housing side wall when the inner member is in the storage position, one of the surfaces of the magnifying means and the inner member side wall forming a compartment;

connecting means for pivotally connecting the inner member with the outer housing, enabling the inner member to be pivotally moved from the storage position within the outer housing to a viewing position; and an information bearing member having information thereon which is substantially reduced and which is human readable when magnified by the magnifying means, the information bearing member being lodged in the compartment and being removable from the compartment when the inner member is pivotally moved to the viewing position.

2. The information locket of claim 1 and further comprising:

grasping tab means protruding from the second partial outer housing side wall.

3. The information locket of claim 1 wherein the first partial outer housing side wall has a first end and a second end.

4. The information locket of claim 3 and further comprising:

lip means proximate the first end of the first partial outer housing side wall; and lip receiving means in the remaining portion of the inner member side wall which receives and holds the lip means when the inner member is in its storage position.

5. The information locket of claim 4 and further comprising:

grasping tab means protruding from the second partial outer housing side wall in a position proximate the lip receiving means of the remaining portion of the inner member side wall.

6. The information locket of claim 4 wherein the lip receiving means comprises a lip receiving depression in the remaining portion of the inner member side wall.

7. The information locket of claim 3 wherein the second end of the first partial outer housing side wall forms a stop which cooperates with a second partial outer housing side wall to define the viewing position of the inner member.

8. The information locket of claim 1 wherein the connecting means comprises ring means which extends through the front wall, the inner member, and the back wall at a pivot point.

9. The information locket of claim 1 wherein the first partial outer housing side wall and the second partial outer housing side wall form a substantially continuous outer housing side wall when the inner member is in its storage position.

10. The information locket of claim 9 wherein the first partial outer housing side wall follows the periphery of the front and back walls for approximately one-half of the periphery.

11. The information locket of claim 10 wherein the front and back walls of the outer housing are essentially circular in configuration.

12. The information locket of claim 11 wherein the portion of the inner member side wall which forms the second partial outer housing side wall has a first radius and wherein the remaining portion of the inner member side wall has a second, smaller radius.

13. The information locket of claim 12 wherein the connecting means pivotally connects the inner member with the outer housing at a pivot point proximate the periphery of the front and back walls at which the first partial outer housing side wall is not present and wherein the pivot point passes through the inner member proximate the second partial outer housing side wall.

* * * * *